United States Patent
Hanwell et al.

(10) Patent No.: US 11,823,361 B2
(45) Date of Patent: Nov. 21, 2023

(54) IMAGE PROCESSING

(71) Applicant: Apical Limited, Cambridge (GB)

(72) Inventors: David Hanwell, Stapleford (GB); Alexey Kornienko, Loughborough (GB)

(73) Assignee: Arm Limited, Cambridge (GB)

( * ) Notice: Subject to any disclaimer, the term of this patent is extended or adjusted under 35 U.S.C. 154(b) by 407 days.

(21) Appl. No.: 17/077,495

(22) Filed: Oct. 22, 2020

(65) Prior Publication Data

US 2021/0133939 A1    May 6, 2021

(30) Foreign Application Priority Data

Nov. 1, 2019  (GB) ..................... 1915929

(51) Int. Cl.
   *G06T 5/00* (2006.01)
   *G06N 3/08* (2023.01)
   (Continued)

(52) U.S. Cl.
   CPC .............. *G06T 5/009* (2013.01); *G06N 3/08* (2013.01); *G06T 5/20* (2013.01); *H04N 25/585* (2023.01)

(58) Field of Classification Search
   CPC ........... G06T 7/0012; G06T 5/50; G06T 7/12; G06T 2207/10116; G06T 7/13; G06T 2207/10024; G06T 2207/10016; G06T 5/009; G06T 2207/20084; G06T 2207/20064; G06T 2207/10064; G06T 2207/30004; G06T 2207/30072; G06T 7/11; G06T 5/008; G06T 2207/10056; G06T 5/002; G06T 2207/20168;
   (Continued)

(56) References Cited

U.S. PATENT DOCUMENTS 6,714,674 B1    3/2004   Stearns
8,279,308 B1 *  10/2012  Borg ..................... H04N 5/20
                                                    348/255
(Continued)

FOREIGN PATENT DOCUMENTS

| CN | 109146905 A |   | 1/2019 |             |
|----|-------------|---|--------|-------------|
| CN | 109272530 A | * | 1/2019 | ........... B64C 39/024 |
| CN | 109685742 A |   | 4/2019 |             |

OTHER PUBLICATIONS

Maini et al.—A Comprehensive Review of Image Enhancement Techniques (Year: 2010).*

(Continued)

Primary Examiner — Quan M Hua
(74) Attorney, Agent, or Firm — EIP US LLP

(57) ABSTRACT

A method comprising obtaining image data representative of pixel intensities associated with an image. Irrespective of a respective magnitude of the pixel intensities, the image data is processed with a logarithmic transformation to transform the pixel intensities to transformed pixel intensities, thereby generating transformed image data representative of the transformed pixel intensities. The logarithmic transformation, L(x), is representable as:

$$L(x) = P \log_M(f(x)) + N$$

where x represents a pixel intensity to be transformed, f(x) represents a function of x and P, M and N represent constants.

20 Claims, 4 Drawing Sheets

(51) Int. Cl.
*G06T 5/20* (2006.01)
*H04N 25/585* (2023.01)

(58) Field of Classification Search
CPC ..... G06T 15/04; G06T 15/005; G01N 33/483;
G06V 20/69; G06V 10/30; G06V 40/10;
G06V 10/25; G06V 20/52; G06V
2201/03; G06V 10/255; G06V 20/693;
G06V 10/20; G06V 10/443; G06V 10/46;
G06V 10/473; G06V 10/774; G06V
10/82; G06V 40/168; G06V 10/143;
G06V 10/245; G06V 10/431
See application file for complete search history.

(56) References Cited

U.S. PATENT DOCUMENTS

| | | | |
|---|---|---|---|
| 2002/0176023 A1 | 11/2002 | Hofflinger et al. | |
| 2004/0042676 A1* | 3/2004 | Srinivasa | G06T 5/40 |
| | | | 382/254 |
| 2015/0372034 A1* | 12/2015 | Chen | H01L 27/14614 |
| | | | 257/334 |
| 2018/0068424 A1* | 3/2018 | Kwon | G01S 17/894 |
| 2019/0159683 A1* | 5/2019 | Ma | A61B 6/481 |
| 2019/0258306 A1 | 8/2019 | Croxford | |

OTHER PUBLICATIONS

United Kingdom Combined Search and Examination Report dated Apr. 27, 2020 for GB Application No. 1915929.2.

\* cited by examiner

IMAGE PROCESSING

CROSS-REFERENCE TO RELATED APPLICATIONS

This application claims priority to GB Application No. GB 1915929.2, filed Nov. 1, 2019, under 35 U.S.C. § 119(a). The above-referenced patent application is incorporated by reference in its entirety.

TECHNICAL FIELD

The present invention relates to image processing.

BACKGROUND

The range of values that can be recorded by an image sensor is typically greater than the range of values that can be displayed (and differentiated between) on a standard dynamic range (SDR) display device. Furthermore, the human visual system has a greater sensitivity to relative differences between darker tones than lighter tones. To compensate for this, it is known to apply gamma correction to the values recorded by an image sensor, especially if the captured range of values is particularly large. Tone mapping may also be applied to reduce a ratio between the highest and lowest value, while maintaining or enhancing the quality of an image represented by the values. Applying gamma correction and tone mapping to an image typically improves the visual appearance of the image as displayed on an SDR display device.

It is desirable to improve the efficiency of further processing of an image, for example using a computer vision (CV) system.

SUMMARY

According to a first aspect, there is provided a method comprising:

obtaining image data representative of pixel intensities associated with an image; and, irrespective of a respective magnitude of the pixel intensities, processing the image data with a logarithmic transformation to transform the pixel intensities to transformed pixel intensities, thereby generating transformed image data representative of the transformed pixel intensities, wherein the logarithmic transformation, $L(x)$, is representable as:

$$L(x) = P \log_M(f(x)) + N$$

where x represents a pixel intensity to be transformed, $f(x)$ represents a function of x, and P, M and N represent constants.

According to a second aspect, there is provided a non-transitory, computer-readable storage medium comprising instructions which, when executed by processing circuitry of a computing device, cause the computing device to perform the method according to the first aspect.

According to a third aspect, there is provided an image processing system comprising:

memory circuitry configured to store:
image data representative of pixel intensities associated with an image; and
transformed image data representative of transformed pixel intensities; and processing circuitry configured to:
irrespective of a respective magnitude of the pixel intensities, process the image data with a logarithmic transformation to transform the pixel intensities to the transformed pixel intensities, thereby generating the transformed image data, wherein the logarithmic transformation, $L(x)$, is representable as:

$$L(x) = P \log_M(f(x)) + N$$

where x represents a pixel intensity to be transformed, $f(x)$ represents a function of x, and P, M and N represent constants.

Further features will become apparent from the following description, given by way of example only, which is made with reference to the accompanying drawings.

DETAILED DESCRIPTION

Figure 1:
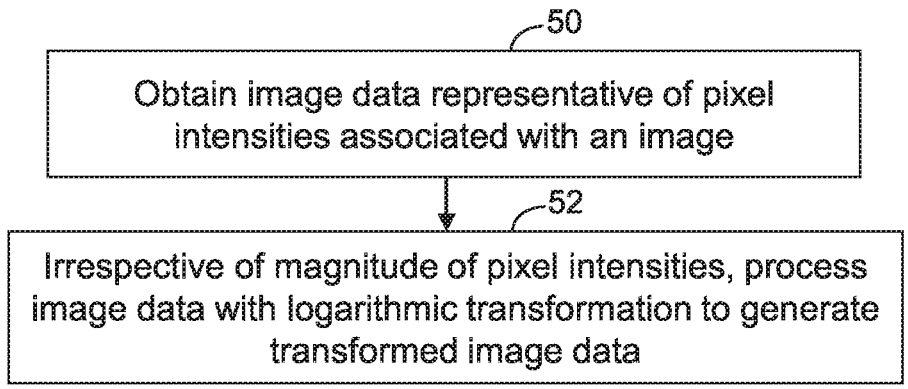
FIG. 1 is a flow diagram showing a method of processing image data according to examples.

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Image sensors generally capture a linear representation of a scene: the value captured by a sensor pixel of an image sensor is proportional to the intensity of light coming from the scene and incident on that sensor pixel. Local contrast measured from a linear representation of a scene is largely invariant to a strength of a light source illuminating that scene: if the light source were to double in intensity, the values recorded by sensor pixels at the bright part and dark part of an image feature such as an edge or corner would also double. This doubling would cancel out when the quotient was computed, resulting in the same measure of local intensity as before the light intensity doubled.

However, unlike quotients measured in the linear domain, differences between pixel intensities (measured either in the linear domain, or after gamma correction or tone mapping have been applied) are not invariant to the strength of the light source illuminating the scene. Thus, in cases in which differences are to be computed, further processing must be performed to obtain a luminance invariant representation of a scene.

For example, processing of image data representative of a scene by a computer vision (CV) system may involve the computation of differences or weighted differences between pixel intensities corresponding to different pixels or different colour channels of the same pixel. CV functionality, e.g., as implemented by a CV system, may include the processing of image data to extract relatively high-level information describing the content of the image. CV functionality may include performing object detection and/or recognition. CV functionality may include other tasks such as motion estimation, scene reconstruction or image restoration. In some examples, CV functionality includes performing simultaneous localization and mapping (SLAM). SLAM comprises generating and/or updating a map of an environment whilst simultaneously determining and/or tracking a location of a sensor within the environment. SLAM processing may involve identifying and locating objects in the environment, and using those identified objects as semantic "landmarks" to facilitate the accurate and/or efficient mapping of the environment. CV functionality may be used for various different purposes, for example in the robotics or automotive industries.

The content of an image, such as objects and structures, may be defined by or otherwise correspond to variation in luminosity and colour. For example, local variations in luminosity and/or colour may be considered to correspond to image features such as edges, corners, or texture. CV systems, such as those comprising artificial neural networks (ANNs) such as convolutional neural networks (CNN) typically detect image features in images by computing differences (or weighted differences) between bright and dark parts of a particular image feature (such as a corner or edge). Differences may be computed efficiently, can be simply represented by linear kernels, and lend themselves well to machine learning algorithms such as gradient descent for training CNNs. However, as differences between pixel intensities are dependent on an illumination of a scene, the CV system must learn that a small difference measured at low light levels is equivalent to a large difference when the scene is brighter. This can increase the complexity and reduce the efficiency of the CV system. For example, where the CV system includes a CNN, the CNN may need at least one additional layer to compensate for the luminance dependence of the differences. Where highly non-linear processing has been applied to an image, such as locally varying tone mapping, a plurality of additional layers is usually needed to correctly compensate for the luminance dependence of the differences.

In examples herein, image data is processed with a logarithmic transformation, irrespective of a respective magnitude of the pixel intensities represented by the image data. The logarithmic transformation can be used to map quotients in a linear domain to differences in an output domain. In this way, differences in pixel intensities, for example as computed by a CV system, will be invariant to scene illumination. This can simplify further processing of transformed image data obtained by processing the image data with the logarithmic transformation. Thus, a system for further processing of the transformed image data, such as the CV system, can be simpler, as it does not require further processing for luminance-invariance: a measured difference will be the same for all illuminance levels. For example, where the image data is to be processed with a CV system including a CNN, the CNN can perform the same task with fewer layers. This can save power and hardware area, e.g. for dedicated processor hardware, such as a neural network accelerator (NNA), sometimes referred to as a neural processing unit (NPU). It is to be appreciated that changing the exposure of an image sensor (e.g. by changing the exposure time or the analogue gain) has an equivalent effect on pixel intensity to altering the strength of an illuminant. The transformed image data in examples is therefore also invariant to changes in the exposure of the image sensor (which may be referred to as image sensor exposure). The logarithmic transformation is described further with reference to FIG. 1.

FIG. 1 is a flow diagram showing a method of processing image data according to examples. At item 50 of FIG. 1, image data representative of pixel intensities associated with an image are obtained. The image represented by the image data may be the entire image captured by an image capture device or a portion of a larger image. Each pixel of the image may have an associated pixel intensity, or the pixel intensities may represent respective intensities of a subset of pixels of the image. The pixel intensities may represent a luminance of the captured light, which is for example a measure of the intensity of light per unit area. Examples of obtaining image data such as the image data of FIG. 1 are described further with reference to FIGS. 2 to 4.

At item 52 of FIG. 1, irrespective of the magnitude of the pixel intensities, the image data is processed with a logarithmic transformation to transform the pixel intensities to transformed pixel intensities, thereby generating transformed image data representative of the transformed pixel intensities. In other words, the logarithmic transformation is applied to the image data regardless of the magnitude of the pixel intensities. Hence, in these examples, the decision to apply the logarithmic transformation is independent of the magnitude of the pixel intensities. The same logarithmic transformation is applied to each of the pixel intensities, regardless of their magnitude, rather than applying different transformations to different ranges of pixel intensities. For example, the image data may represent two pixels with pixel intensities corresponding to a darkest and a brightest level detectable by an image sensor. The same logarithmic transformation may nevertheless be applied to each of these pixel intensities. It is to be appreciated, though, that in the example of FIG. 1 the logarithmic transformation is itself a function of the magnitude of the pixel intensities (but the same function is applied to the pixel intensities irrespective of the magnitude of the pixel intensities).

The logarithmic transformation, L(x), in these examples is representable as:

$$L(x) = P \log_M(f(x)) + N$$

where x represents a pixel intensity to be transformed, f(x) represents a function of x, and P, M and N represent constants. The logarithm function ($\log_M$) may be in any base, represented by the constant M. Differences between the transformed pixel intensities are invariant to changes in an illuminance of the scene and/or in an exposure of an image sensor used to obtain the image data. Further processing involving the computation of differences or weighted differences between the transformed pixel intensities may therefore be more straightforward than otherwise. To further explain this, a worked example will now be discussed.

Example Logarithmic Functions

As an example, if there is an edge in an image between two grey objects in a scene illuminated by a light source, the pixel intensities corresponding to these two objects may be denoted as a and b. The local contrast (as measured in the linear domain) may be represented as a/b. If the illumination of the light source is increased by a factor of C, the pixel intensities corresponding to the objects in the scene may be denoted as a' and b'. The local contrast (as measured in the linear domain) may be computed as:

$$\frac{a'}{b'} = \frac{Ca}{Cb} = \frac{a}{b}$$

and remains unchanged despite the change in illumination. The local contrast is therefore invariant to an illuminance of the scene.

In an image processing pipeline, a gamma correction of 0.45 may be applied to each of the pixel intensities, to map a pixel intensity of x to $x^{0.45}$. This gamma correction may then be followed by a CV system which measures the difference between the two pixel intensities to try to determine whether or not an edge is present. Before the illuminance is increased, the difference between the pixel intensities may be expressed as:

$$a^{0.45} - b^{0.45}$$

and after the illuminance is increased, this difference may be expressed as:

$$a'^{0.45} - b'^{0.45} = (Ca)^{0.45} - (Cb)^{0.45} = C^{0.45}[a^{0.45} - b^{0.45}].$$

Changing the illuminance by a factor of C therefore increases the difference between the pixel intensities by a factor of $C^{0.45}$. The difference between the pixel intensities after gamma correction is thus not invariant to the illuminance of the scene.

However, if the pixel intensities are processed using the logarithmic function described above (with f(x)=x), the difference between the transformed pixel intensities before increasing the illuminance may be expressed as:

$$L(a) - L(b) = P\log_M(a) + N - P\log_M(b) - N = P\log_M(a) - P\log_M(b)$$

$$= P\log_M\left(\frac{a}{b}\right)$$

After the illuminance is increased, the difference between the transformed pixel intensities may be expressed as:

$$L(a') - (b') = P\log_M(Ca) + N - P\log_M(Cb) - N$$

$$= P\log_M(C) + P\log_M(a) - P\log_M(C) - P\log_M(b)$$

$$= P\log_M(a) - P\log_M(b) = P\log_M\left(\frac{a}{b}\right).$$

Hence, by transforming the pixel intensities using the logarithmic transformation, the difference between the transformed pixel intensities after increasing the illuminance is the same as that prior to the increase in illuminance. In other words, processing the pixel intensities with the logarithmic transformation transforms the pixel intensities such that a difference between the transformed pixel intensities is invariant to changes in an illumination of a scene.

In this example, the function of x within the logarithm function is f(x)=x. However, in other examples, this function may be more complex. In one case, this function may be expressed as:

$$f(x) = 1 + 2^{d-dw}x$$

where d represents a further constant and dw represents the number of bits used to represent the image data.

The constants P and N may take various values, which may be selected based on the particular image processing pipeline and/or image capture device used to process the image data. For example, the constant N may take the value zero. In one case, P may be expressed as:

$$P = \frac{(2^{dwo} - 1)}{\log_M(1 + 2^{d-dw}(2^{dw} - 1))}$$

where dw represents the number of bits used to represent the image data, dwo represents the number of bits used to represent the transformed image data, and d represents a further constant. This may be combined with any suitable form of f(x), M and N. For example, the logarithmic function, L(x), may be representable as:

$$L(x) = \frac{\log_M(1 + 2^{d-dw}x)}{\log_M(1 + 2^{d-dw}(2^{dw} - 1))}(2^{dwo} - 1)$$

This logarithmic function may be implemented efficiently in fixed-point hardware. In other cases, though, floating-point hardware may be used. In examples such as this, a bit precision of the image data may be maintained throughout an image processing pipeline, before applying the logarithmic function to the image data to reduce a bit precision of the image data. For example, the number of bits used to represent the transformed image data may be less than the number of bits used to represent the image data prior to the transformation of the image data by the logarithmic function. This is merely an example processing pipeline, though.

Example Image Processing Systems

Figure 2:
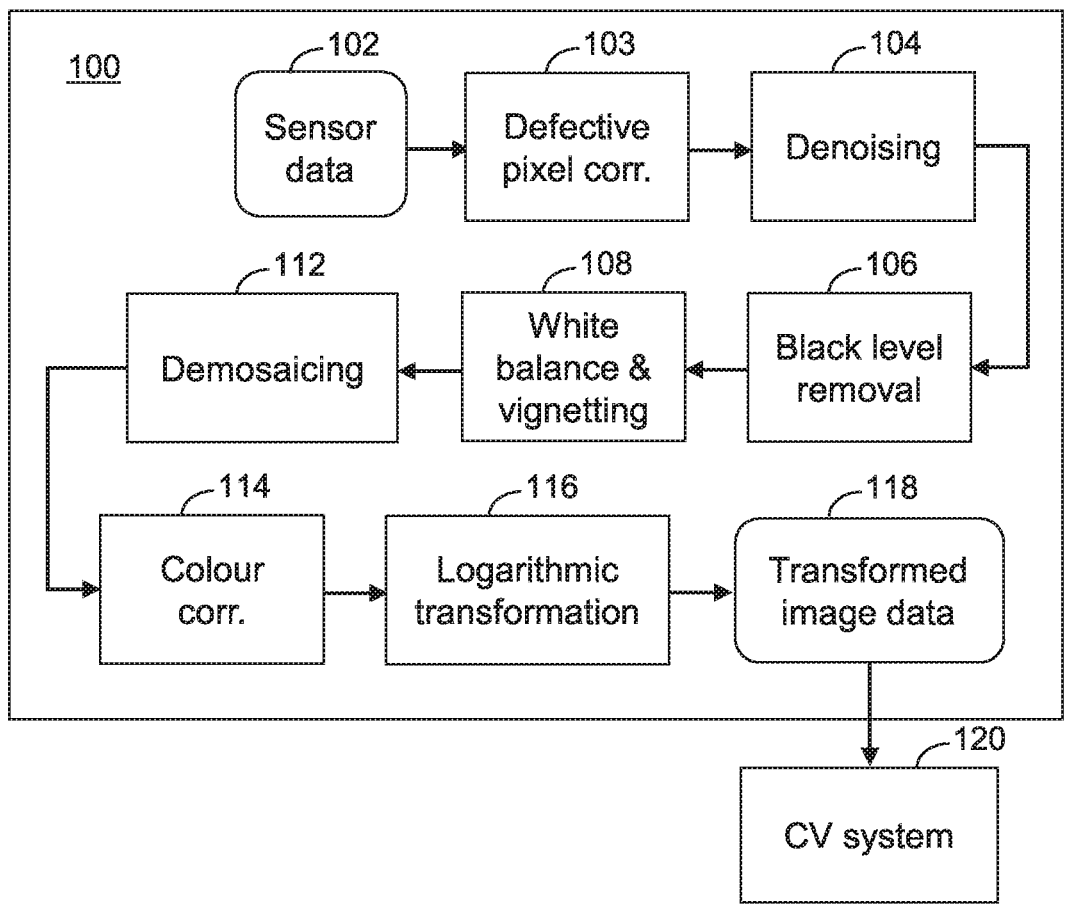
FIG. 2 is a schematic diagram showing a system including an image processing pipeline according to examples.

An example system including an image processing pipeline 100 is shown schematically in FIG. 2. The image processing pipeline 100 is arranged to output a representation of an image for processing by a further image processing system, which in this case is a CV system 120.

At item 102 of FIG. 2, sensor data representative of sensor pixel values from respective sensor pixels of an image sensor of an image capture device is obtained. An image sensor typically includes an array of sensor pixels, which may be any suitable photosensors for capturing images. For example, a typical sensor pixel includes a photosensitive element such as a photodiode that can convert incident light into electronic signals or data. The sensor pixel may for example be a charge-coupled device (CCD) or a complementary metal-oxide-semiconductor (CMOS).

The sensor pixel values represent at least one characteristic of the light captured by the image sensor. For example, the sensor data may be representative of an intensity of the light captured by each sensor pixel, which may be proportional to the number of photons captured by that sensor pixel. The sensor pixel values may therefore be proportional to an intensity of light captured by respective sensor pixels of the image sensor. In such cases, the sensor data may be considered to provide a linear representation of the scene.

In the example of FIG. 2, the sensor data is obtained by an image capture device including a colour filter array. Such a colour filter array typically includes a pattern of colour filter elements corresponding to respective sensor pixels of the array of sensor pixels of the image sensor. For example, the colour filter array may be considered to form a mosaic or repeating pattern, such as a Bayer array. A colour filter element generally allows light of a particular colour to pass through to the corresponding sensor pixel. By including colour filter elements transmissive to different colours of light (e.g. red, green and blue), the colour filter array allows different sensor pixels of the array of sensor pixels to receive different colours of incident light, allowing a full-colour image to be captured.

At item 103 of FIG. 2, the sensor data undergoes defective pixel correction. In this way, defective sensor pixels, such as those that are broken, damaged or otherwise not fully functional, can be compensated for. For example, a sensor pixel value for a defective pixel may be obtained based on sensor pixel values of at least one nearby non-defective sensor pixel. For example, such a sensor pixel value may be obtained by interpolating sensor pixel values of at least two neighbouring non-defective sensor pixels.

At item 104 of FIG. 2, denoising is applied to the sensor data to remove noise present in the sensor data. Noise may arise in the sensor data from several sources. Shot noise, arising due to the quantized nature of light, may occur in the photon count of the image sensor. Dark current noise arises from small currents in the image sensor when no radiation is being received and may be dependent on environmental factors such as temperature. Read noise arises from the electronics in the image sensor and is related to the level of analogue-gain used by the image sensor. At least one denoising algorithm may be applied to remove noise arising from at least one of a plurality of noise sources.

The sensor pixel values represented by the sensor data may include pedestal values, which are for example constant values which are added to sensor pixel values to avoid negative sensor pixel values during the image capture process. For example, a sensor pixel may still register a non-zero sensor pixel value even when exposed to no light, e.g. due to noise (as discussed above). To avoid reducing the sensor pixel values to less than zero, the pedestal values may be added. Hence, before further processing is performed, the sensor data in the example of FIG. 2 undergoes black level removal at item 106 of FIG. 2, to remove the pedestal values.

At item 108 of FIG. 2, white balance and vignetting correction are performed. White balance for example involves adjusting at least some of the sensor pixel values so that the colour of white, or other light or neutral-coloured, objects in a scene is accurately represented. Vignetting, sometimes referred to as lens shading, is the phenomenon of the brightness or intensity of an image gradually decreasing radially away from the centre of the image. Vignetting may be caused by various features of an image capture device, and may be corrected for using various algorithms, as the skilled person will appreciate.

At item 112 of FIG. 2, the sensor data is demosaiced to generate image data. Demosaicing may be applied to input data representative of a plurality of different colour channels, obtained by sensor pixels associated with colour filters of different respective colours, to reconstruct a full colour image. In such cases, the input data (in this case, the sensor data) includes an intensity value for solely one colour channel per pixel location, whereas the demosaicing allows an intensity value for each of at least one colour channel to be obtained for each pixel location. Demosaicing for example involves interpolating between adjacent pixels of the same colour channel to obtain a value at a location between these adjacent pixels, such as at a location corresponding to a pixel of a different colour channel. This may be performed for each of a plurality of colour channels in order to obtain, at each pixel location, an intensity value for each of the colour channels. In other cases than that of FIG. 2, in which the sensor data represents a single colour channel, grayscale demosaicing may be performed, in which a grayscale intensity is obtained at each pixel location, indicating an intensity value for a single colour channel (e.g. from white (lightest) to black (darkest)).

At item 114 of FIG. 2, the image data undergoes colour correction. Colour correction may be used to adjust a colour of the image represented by the image data. For example, colour correction may be used to adjust the intensities of respective colour channels of the image to correctly capture the colour of the scene represented by the image. Colour correction may also or alternatively be used to adjust a colour gamut of the image.

At item 116 of FIG. 2, the image data is processed with the logarithmic transformation to generate the transformed image data 118. A typical image processing pipeline may include gamma correction and/or tone mapping (which are examples of non-linear functions). However, in the example of FIG. 2, the transformed image data is generated without processing the sensor data and the image data with a non-linear function in an intervening period between obtaining the sensor data and processing the image data with the logarithmic transformation. For example, the image data may be generated from the sensor data without performing gamma correction and/or tone mapping. Similarly, the transformed image data 118 may be generated from the image data without performing gamma correction and/or tone mapping. In such cases, non-linear processing, such as gamma correction and/or tone mapping, may be omitted irrespective of the magnitude of the sensor pixel values and pixel intensities. In these examples, the other correction processes applied to the sensor data and/or image data in the image processing pipeline 100, including defective pixel correction 103, denoising 104, black level removal 106, white balance and vignetting correction 108, demosaicing 112 and colour correction 114 may be linear processes, involving linear functions rather than non-linear functions. In this way, the image data processed with the logarithmic transformation may provide a linear representation of the scene. By omitting non-linear processing such as gamma correction and tone mapping, differences between the transformed pixel intensities represented by the transformed image data 118 may remain invariant to changes in scene illuminance and/or image sensor exposure.

In this example, a bit precision of the representation of the image (as the sensor data and, latterly, the image data) may be maintained until the logarithmic transformation 116 is performed. In other words, the number of bits used to represent the sensor data may be the same as the number of bits used to represent the image data. The scene may therefore be represented more precisely by the image data, and by the transformed image data.

Processing the image data with the logarithmic transformation may, however, reduce a bit precision of the representation of the image. In such cases, the number of bits used to represent the transformed image data is less than the number of bits used to represent the image data. This may reduce storage and/or processing requirements for further storage and/or processing of the transformed image data.

The transformed image data 118 may provide a representation of the scene which is unsuitable for human viewing. For example, the transformed image data 118 may provide a representation of the scene which a human viewer would perceive as visually different from the scene itself, for example with different tones and/or colours. Nevertheless, the transformed image data 118 may be more efficiently processed by a further image processing system, such as a CV system, than representations that are suitable for human viewing. The logarithmic transformation therefore need not be constrained by the limitations of a display device, e.g. if the transformed image data 118 obtained by the logarithmic transformation of the image data is not intended to be displayed on a display device. Instead, the logarithmic transformation may be tailored towards providing a representation that is efficient to process by a further image processing system.

In the example of FIG. 2, the transformed image data 118 in FIG. 2 is then processed by the further image processing system, which in this example is a CV system 120. Further processing of the transformed image data 118 may include processing the transformed image data to generate difference data representative of differences between respective pairs of the transformed pixel intensities. Such differences may be computed for various different purposes, and may be or include weighted differences.

In some cases, generating the difference data comprises processing the transformed image data with kernel data representative of a kernel. A kernel may be associated with a layer of an ANN, such as a CNN, of the CV system 120. A CNN for example includes an input layer, a plurality of convolutional layers, a number of fully connected layers and an output layer. The input layer for example corresponds with an input to the CNN, which in this example is the transformed image data 118. The convolutional layers typically extract particular features from the input data, to create feature maps. The fully connected layers then use the feature maps for classification, for example to identify that a particular object is present in the transformed image represented by the transformed image data. Pooling may be performed between at least one of the layers of the CNN. Pooling for example allows values for a region of the transformed image or a feature map to be aggregated or combined, for example by taking the highest value within a region. This reduces the amount of computation for subsequent layers of the CNN.

Kernels for example allow image features of an image to be identified, and may be referred to as filter kernels or filters. For example, a kernel may be of a neural network architecture configured to detect at least one image feature of the image, such as an edge, corner or texture. For example, the kernel may be of a convolutional layer of a CNN. The precise features that the kernels identify typically depend on an object that the CV system is trained to identify. The kernels may be of any size. As an example, the CV system may include a plurality of kernels, each of which is a 3 by 3 matrix. Each of the kernels may be convolved with the transformed image data with a stride of 1. The kernels may be convolved with a patch of the transformed image represented by the transformed image data (or a feature map obtained by convolution of a kernel with such a patch) to identify the image feature the kernel is designed to detect. Convolution for example involves multiplying each of the transformed pixel intensities of the patch of the transformed image (in this example a 3 by 3 image patch) or each element of a feature map by a weight in the kernel before adding the result of this operation to the result of the same operation applied to neighbouring transformed pixel intensities or neighbouring feature map elements. A stride for example refers to the number of pixel elements or feature map elements a kernel is moved by between each operation. A stride of 1 therefore indicates that, after calculating the convolution for a given 3 by 3 image patch, the kernel is slid across the transformed image by 1 pixel and the convolution is calculated for a subsequent patch of the transformed image. This process may be repeated until the kernel has been convolved with the entirety of the transformed image (or the entire portion of the transformed image for which a convolution is to be calculated), or with the entirety of a feature map the kernel is to be convolved with.

In examples in which difference data is generated, a kernel used to process the transformed image data may include at least one negative weight (with a value less than 0). An example kernel is:

$$\begin{pmatrix} -1 & 0 & 1 \\ -1 & 0 & 1 \\ -1 & 0 & 1 \end{pmatrix}$$

However, this is not intended to be limiting, as many other kernels are possible. Where a kernel includes at least one negative weight, convolving the kernel with the transformed image data may amount to a subtraction rather than an addition. The performance of this subtraction may be considered to correspond to the generation of the difference data.

It is to be appreciated that the image processing pipeline 100 of FIG. 1 is merely an example, and other image processing pipelines may omit various steps (such as at least one of the defective pixel correction 103, denoising 104, black level removal 106, white balance and vignetting 108, and colour correction 114), may have a different order of steps and/or may include additional processing steps. For example, defective pixel correction and/or denoising may be applied to the sensor data before the sensor data is processed by an image processing pipeline. As another example, black level removal may be omitted if no pedestal values are added.

Figure 3:
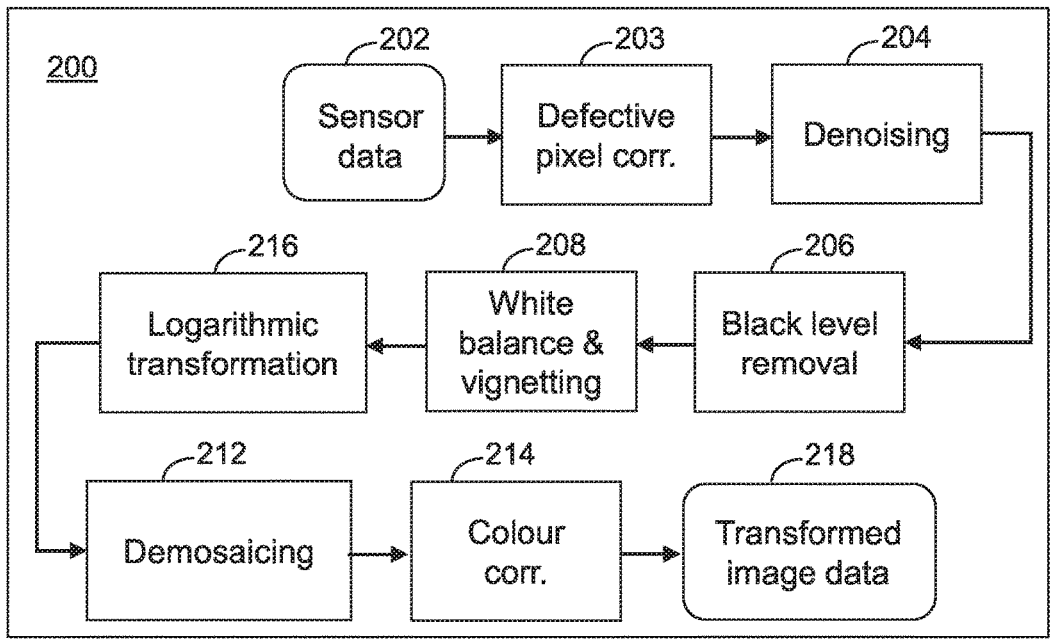
FIG. 3 is a schematic diagram showing an image processing pipeline according to examples.

FIG. 3 shows another example of an image processing pipeline 200. Features of the image processing pipeline 200 of FIG. 3 that are similar to corresponding features of FIG. 2 are labelled with the same reference numeral but incremented by 100. The image processing pipeline 200 of FIG. 2 may be used in the system of FIG. 2, or in a different system, such as with different processing of the transformed image data 218 than that performed by the CV system 120 of FIG. 2.

The image processing pipeline 200 of FIG. 3 is the same as the image processing pipeline 100 of FIG. 2, except for the order of the logarithmic transformation 216, the demosaicing 212 and the colour correction 214. In FIG. 3, the logarithmic transformation 216 is applied to the image data before the demosaicing 212 is performed. This can reduce processing demands for performing the demosaicing 212, as the logarithmic transformation 216 may reduce the bit precision of the representation of the scene, such that the transformed image data comprises fewer bits than the image data. In this case, the transformed image data 218 generated by processing the image data with the logarithmic transformation 216 is demosaiced without processing the image data and the transformed image data with a non-linear function in an intervening period between obtaining the pixel intensities from the image sensor and demosaicing the transformed image data. This ensures that differences between transformed pixel intensities (after demosaicing) remain invariant to changes in illuminance and/or image sensor exposure.

In FIG. 3, the colour correction 214 is applied subsequently to the demosaicing 212 to generate the transformed image data 218 that is output by the image processing pipeline 200. It is to be appreciated that, in this example, the term "transformed image data" is intended to refer to the data output by processing the image data with the logarithmic transformation 216, and to subsequent instances of this data after application of subsequent processing steps (in this case, the demosaicing 212 and the colour correction 214).

Figure 4:
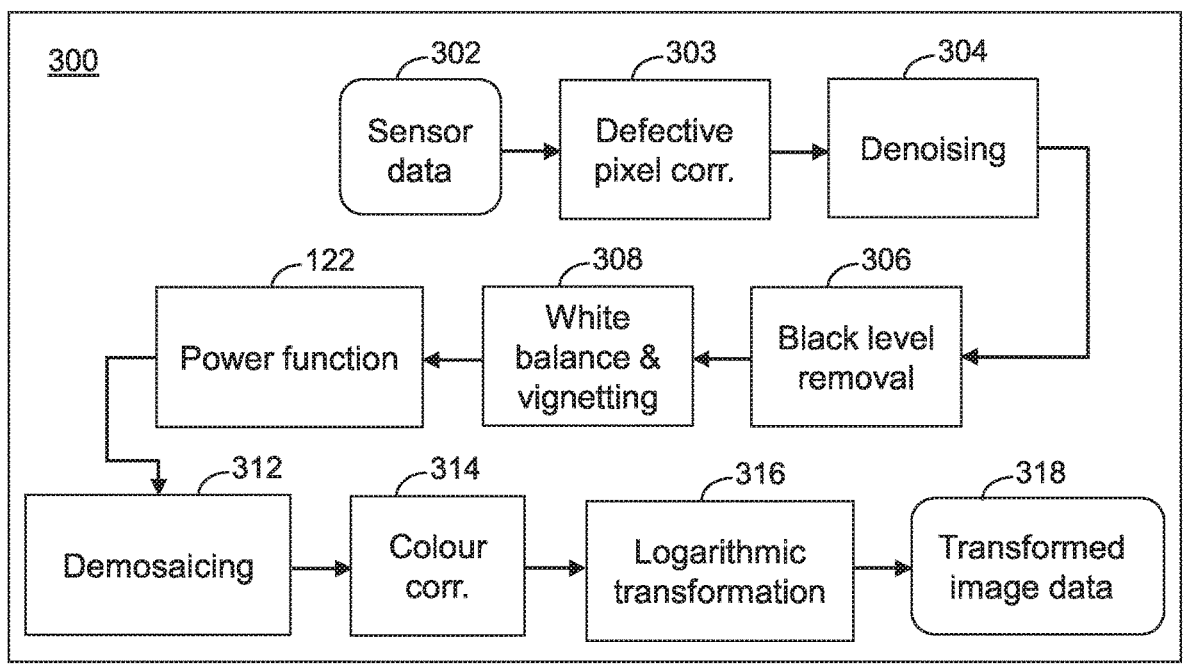
FIG. 4 is a schematic diagram showing an image processing pipeline according to further examples.

FIG. 4 shows another example of an image processing pipeline 300. Features of the image processing pipeline 300 of FIG. 4 that are similar to corresponding features of FIG. 2 are labelled with the same reference numeral but incremented by 200. The image processing pipeline 300 of FIG. 4 may be used in the system of FIG. 2, or in a different system, such as with different processing of the transformed image data 318 than that performed by the CV system 120 of FIG. 2.

The image processing pipeline 300 of FIG. 4 is the same as the image processing pipeline 100 of FIG. 2, except that it includes reducing a bit precision of the image data before processing the image data with the logarithmic transformation 316 to generate the transformed image data 318. This can reduce the processing demands of subsequent processing of the image processing pipeline 300, such as the demosaicing 312, colour correction 314 and the logarithmic transformation 316 itself.

In the example of FIG. 4, reducing the bit precision includes processing the image data using a power function 122 with an exponent with a value greater than zero and less than one, such as a square root function. For example, the bit precision may be reduced from 24 to 16 bits. Reducing the bit precision in this way may nevertheless preserve detail in the transformed image. Furthermore, after processing the image data with the logarithmic transformation 316, differences between transformed pixel intensities represented by the transformed image data 318 remain invariant to changes in illuminance and/or image sensor exposure.

Figure 5:
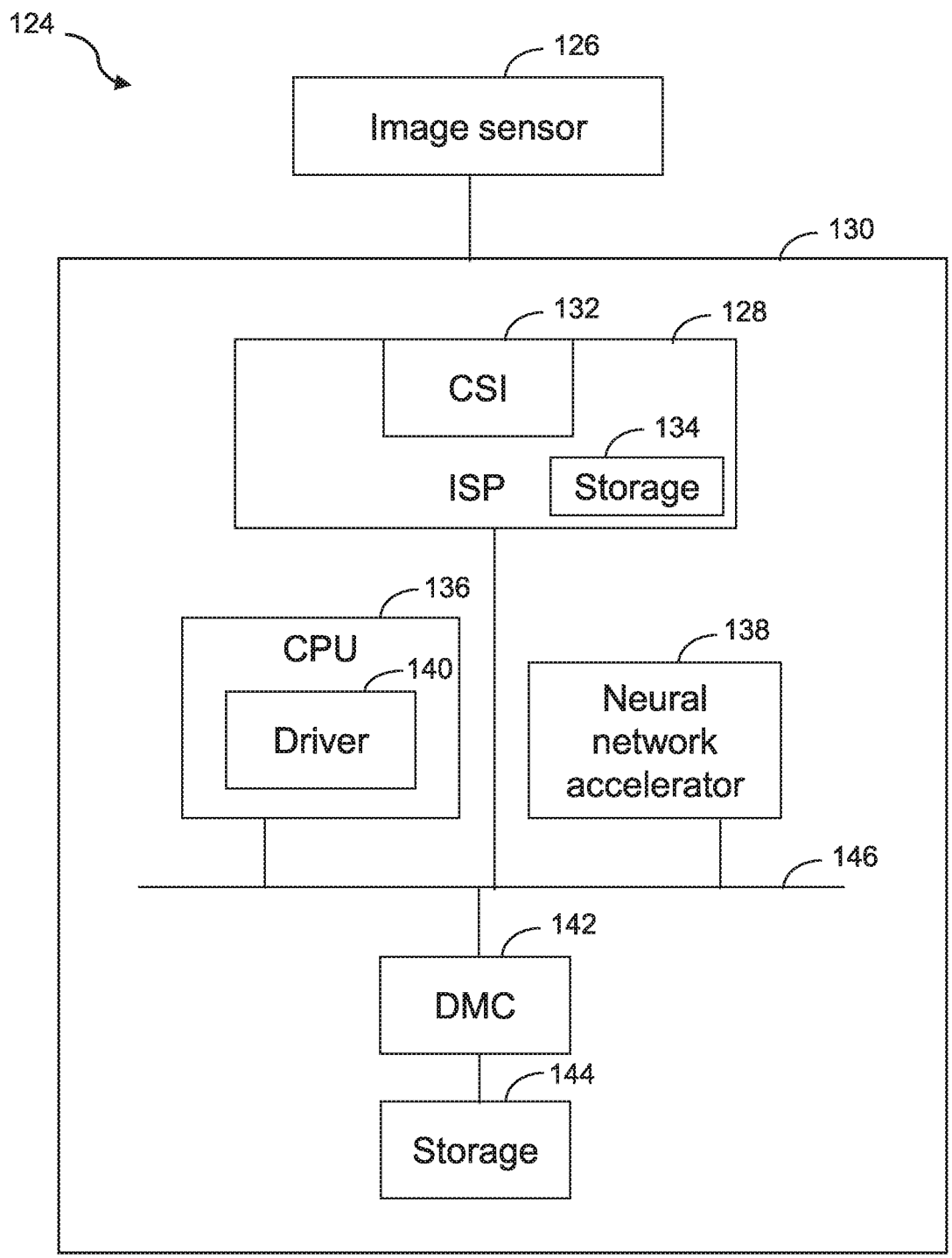
FIG. 5 shows schematically internal components of an image processing system according to examples.

An example of an image processing system 124 for use with the methods described herein is shown schematically in FIG. 5. The image processing system 124 of FIG. 5 may be coupled to or form part of a computer device, such as a personal computer, a laptop, a smartphone or an on-board computer device which may be coupled to or mounted within a vehicle such as a car.

The image processing system 124 includes an image sensor 126, such as that described above with reference to FIGS. 1 and 2. The image sensor 126 may be arranged to capture video data, which may be in the form of a series of images captured sequentially, with each image corresponding to a frame of the video. In other cases, though, the image sensor 126 may be arranged to capture still images.

In FIG. 5, the image sensor 126 is arranged to transfer sensor data to an image signal processor (ISP) 128 of a computing system 130 via a camera serial interface (CSI) 132. The ISP 128 may implement an image processing pipeline such as the image processing pipelines 100, 200, 300 of FIGS. 2 to 4. The ISP 128 may, for example, comprise processing circuitry configured to process image data representative of pixel intensities associated with an image with a logarithmic transformation, such as those discussed above, to transform the pixel intensities to transformed pixel intensities, thereby generating transformed image data. In such cases, the ISP 128 may be implemented in hardware, for example as a System on a Chip (SoC). In other cases, though, the ISP 128 may be implemented partly in software and partly in hardware, or solely in software.

The image processing system 124 of FIG. 5 (in this example, the ISP 128) includes storage 134 for storing the image data and the transformed image data. The storage 134 may be in the form of memory circuitry, and may form on-chip storage of the ISP 128, which may be referred to as local storage of the ISP 128. The local stage may for example be a static random access memory (SRAM), although other memory types are possible. In other cases, though, at least one of the image data and the transformed image data may be stored externally to the ISP 128.

The computing system 130 of FIG. 5 includes at least one processor, in this example a central processor unit (CPU) 136. The computing system 130 in this example also includes neural network circuitry configured to implement a CNN of a CV system configured to process the transformed image data to detect at least one image feature of the image. In other cases, the computing system 130 may include a different system for processing the transformed image data, such as a different CV system that is configured to detect at least one image feature. In the example of FIG. 5, the neural network circuitry includes a neural network accelerator 138, which is a processor dedicated to implementing at least classification of data using a neural network. For example, the neural network accelerator 138 may be configured to implement a neural network of a CV system such as those described above. In other examples, though, a neural network may be implemented using a more general processor, such as the CPU 136 or a GPU. The neural network accelerator 138 may include an interface via which inputs to a neural network may be received, for example from the ISP 128. The CPU 136 of FIG. 5 includes a driver 140 which for example provides an interface between software configured to control or configure the neural network and the neural network accelerator 138.

Although not shown, it is to be appreciated that the computing system 130 may include other or alternative processors such as a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. The computing system may also or alternatively include a processor implemented as a combination of computing devices, e.g., a combination of a DSP and a microprocessor, a plurality of microprocessors, one or more microprocessors in conjunction with a DSP core, or any other such configuration. The computing system may also or alternatively include at least one graphics processing unit (GPU). The ISP 128, the neural network accelerator 138 and/or at least one further processor (if present) may be combined as a SoC or onto multiple SoCs to form one or more application processors.

The computing system 130 of FIG. 5 also includes a dynamic memory controller (DMC) 142 which may be used to control access to storage 144 of the computing system 130. The storage 144 may be configured to store the transformed image data and/or an output of the CV processing implemented by the neural network accelerator 138, and may additionally be configured to store the image data and/or the sensor data.

The storage 144 may comprise a main memory, otherwise referred to as a "primary memory". The storage 144 may be an external memory, in that the memory 144 is external to the at least one of the ISP 128 and the neural network accelerator 138. For example, the storage 144 may be or comprise "off-chip" storage. The storage 144 may have a greater storage capacity than the storage 134 of the ISP 128 or storage of the neural network accelerator 138. In the example of FIG. 5, the computing system 130 comprises the storage 144. The storage 144 may, for example, comprise a magnetic or optical disk and disk drive or a solid-state drive (SSD). In some examples, the storage 144 comprises a synchronous dynamic random-access memory (SDRAM). For example, the storage 144 may comprise a double data rate synchronous dynamic random-access memory (DDR-SDRAM). The storage 144 in examples may include further storage devices, for example magnetic, optical or tape media, compact disc (CD), digital versatile disc (DVD) or other data storage media. The storage 144 may be removable or non-removable from the computing system 130.

The components of the computing system 130 in the example of FIG. 5 are interconnected using a systems bus 146. This allows data to be transferred between the various components. The bus 146 may be or include any suitable interface or bus. For example, an ARM® Advanced Microcontroller Bus Architecture (AMBA®) interface, such as the Advanced eXtensible Interface (AXI), may be used.

It is to be appreciated that the image processing system 124 of FIG. 5 is merely an example and other image processing systems may be used in other examples. For example, where further processing to be applied to the transformed image data does not include a neural network, the image processing system may not include a neural network accelerator.

Figure 6:
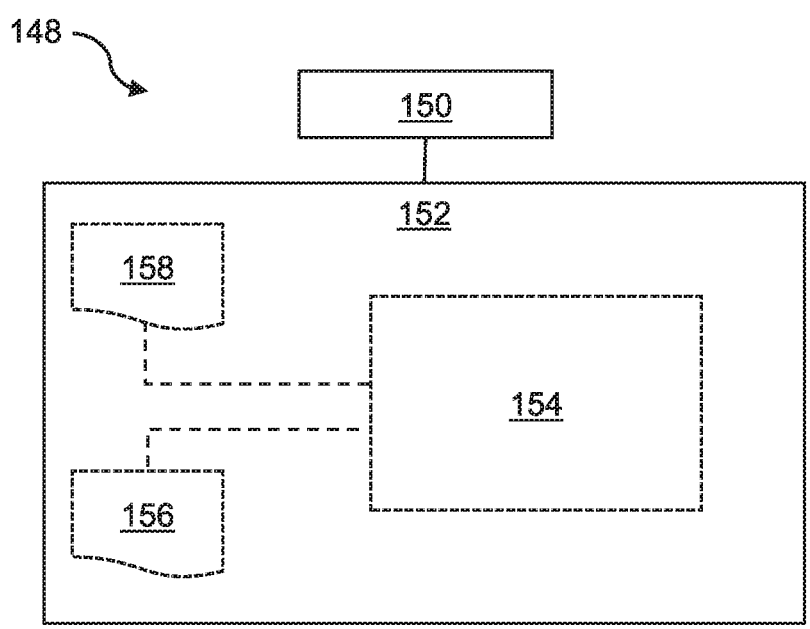
FIG. 6 is a schematic diagram showing a non-transitory computer-readable medium according to examples.

FIG. 6 is a schematic diagram showing an example 148 of processing circuitry 150 and a non-transitory computer-readable storage medium 152 comprising computer-executable instructions 154. The computer-executable instructions 154, when executed by the processing circuitry 150, cause a computing device, such as a computing device including the processing circuitry 150, to perform any of the methods described herein. For example, the computing device may be caused to generate transformed image data by processing image data using a logarithmic function. The computer-readable storage medium 152 may be arranged to store image data 156 representative of pixel intensities associated with an image. The image data 156 may correspond to the sensor data, and may therefore be RAW data obtained from an image capture device. In other cases, though, various pre-processing, such as defective pixel correction 103, denoising 104, black level removal 106, white balance and vignetting correction 108, demosaicing 112 and/or colour correction 114, may have already been applied to the image data 156. The computer-executable instructions 154, when executed by the processing circuitry 150, may be configured to cause a computing device to process the image data 156 with a logarithmic function to generate transformed image data 158, irrespective of a magnitude of the pixel intensities represented by the image data 156. The transformed image data 158 may be stored in the computer-readable storage medium 152. Although in FIG. 6, the image data 156 and the transformed image data 158 are shown as being stored on the computer-readable storage medium 152, in other examples, at least one of the image data 156 and the transformed image data 158 may be stored in storage which is external to (but accessible by) the computer-readable storage medium 152.

The above examples are to be understood as illustrative examples. Further examples are envisaged. Although the examples above are described with reference to a CV system, it is to be appreciated that image data may be processed by the logarithmic transformation described herein in other contexts or for other purposes, such as in other situations in which differences between pixel intensities are to be computed.

For example, image data representative of a plurality of different colour channels may be processed separately with a logarithmic function such as those described herein, irrespective of a magnitude of the pixel intensities represented by the image data, to generate the transformed image data. Differences between transformed pixel intensities for different colour channels may then be calculated from the transformed image data. Such differences are invariant to changes in illumination and/or image sensor exposure, obviating the need for further processing to compensate for such changes between different images (e.g. different frames of a video) or between different portions of the same image. In such cases, the transformed pixel intensities may therefore represent a plurality of different colour channels, respectively.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed within the scope of the accompanying claims.

What is claimed is:

1. A method comprising:
   obtaining image data representative of pixel intensities associated with an image; and,
   irrespective of a respective magnitude of the pixel intensities, processing the image data with a logarithmic transformation to transform the pixel intensities to transformed pixel intensities, thereby generating transformed image data representative of the transformed pixel intensities,
   wherein the logarithmic transformation, L(x), is representable as:

$$L(x) = P \log_M(f(x)) + N$$

where x represents a pixel intensity to be transformed, f(x) represents a function of x, and P, M and N represent constants,
   wherein:

$$f(x) = 1 + 2^{2-dw}x$$

wherein d represents a further constant and dw represents the number of bits used to represent the image data.

2. The method according to claim 1, wherein:

$$P = \frac{(2^{dwo} - 1)}{\log_M(1 + 2^{d-dw}(2^{dw} - 1))}$$

where dw represents the number of bits used to represent the image data, dwo represents the number of bits used to represent the transformed image data, and d represents the or a further constant.

3. The method according to claim 1, wherein the number of bits used to represent the transformed image data is less than the number of bits used to represent the image data.

4. The method according to claim 1, comprising processing the transformed image data to generate difference data representative of differences between respective pairs of the transformed pixel intensities.

5. The method according to claim 4, wherein generating the difference data comprises processing the transformed image data with kernel data representative of a kernel.

6. The method according to claim 5, wherein the kernel is of a neural network architecture configured to detect at least one image feature of the image.

7. The method according to claim 5, wherein the kernel is of a convolutional layer of a convolutional neural network (CNN).

8. The method according to claim 1, comprising reducing a bit precision of the image data before processing the image data with the logarithmic transformation.

9. The method according to claim 8, wherein reducing the bit precision of the image data comprises processing the image data using a power function with an exponent with a value greater than zero and less than one.

10. The method according to claim 1, comprising:
obtaining the pixel intensities using an image sensor such that a magnitude of the pixel intensities is proportional to an intensity of light captured by the image sensor; and
processing the image data with the logarithmic transformation without processing the image data with a non-linear function in an intervening period between obtaining the pixel intensities and processing the image data with the logarithmic transformation.

11. The method according to claim 1, comprising:
obtaining sensor data representative of sensor pixel values from respective sensor pixels of an image sensor;
demosaicing the sensor data to generate the image data; and
processing the image data with the logarithmic transformation to generate the transformed image data without processing the sensor data and the image data with a non-linear function in an intervening period between obtaining the sensor data and processing the image data with the logarithmic transformation.

12. The method according to claim 1, comprising:
demosaicing the transformed image data without processing the image data and the transformed image data with a non-linear function in an intervening period between obtaining the pixel intensities from an image sensor and demosaicing the transformed image data.

13. The method according to claim 1, wherein the image data is generated from sensor data representative of sensor pixel values from respective sensor pixels of an image sensor without performing at least one of gamma correction or tone mapping.

14. A non-transitory, computer-readable storage medium comprising instructions which, when executed by processing circuitry of a computing device, cause the computing device to perform the method of claim 1.

15. An image processing system comprising:
memory circuitry configured to store:
image data representative of pixel intensities associated with an image; and
transformed image data representative of transformed pixel intensities; and
processing circuitry configured to:
irrespective of a respective magnitude of the pixel intensities, process the image data with a logarithmic transformation to transform the pixel intensities to the transformed pixel intensities, thereby generating the transformed image data, wherein the logarithmic transformation, L(x), is representable as:

$L(x)=P\log_M(f(x))+N$ where x represents a pixel intensity to be transformed, f(x) represents a function of x, and P, M and N represent constants, wherein:

$f(x)=1+2^{d-dw}x$ where d represents a further constant and dw represents the number of bits used to represent the image data.

16. The image processing system according to claim 15, wherein:

$$P = \frac{(2^{dwo}-1)}{\log_M(1+2^{d-dw}(2^{dw}-1))}$$

where dw represents the number of bits used to represent the image data, dwo represents the number of bits used to represent the transformed image data, and d represents the or a further constant.

17. The image processing system according to claim 15, wherein the image processing system comprises:
an image signal processor (ISP) comprising the processing circuitry; and
a computer vision (CV) system configured to process the transformed image data to detect at least one image feature of the image.

18. The image processing system according to claim 17, wherein the CV system comprises neural network circuitry configured to implement a convolutional neural network (CNN).

19. A method comprising:
obtaining image data representative of pixel intensities associated with an image; and,
irrespective of a respective magnitude of the pixel intensities, processing the image data with a logarithmic transformation to transform the pixel intensities to transformed pixel intensities, thereby generating transformed image data representative of the transformed pixel intensities,
wherein the logarithmic transformation, L(x), is representable as:

$L(x)=P\log_M(f(x))+N$ where x represents a pixel intensity to be transformed, f(x) represents a function of x, and P, M and N represent constants, wherein:

$$P = \frac{(2^{dwo}-1)}{\log_M(1+2^{d-dw}(2^{dw}-1))}$$

where dw represents the number of bits used to represent the image data, dwo represents the number of bits used to represent the transformed image data, and d represents the or a further constant.

20. The method according to claim 19, comprising:
obtaining the pixel intensities using an image sensor such that a magnitude of the pixel intensities is proportional to an intensity of light captured by the image sensor; and
processing the image data with the logarithmic transformation without processing the image data with a non-linear function in an intervening period between obtaining the pixel intensities and processing the image data with the logarithmic transformation.

* * * * *